United States Patent Office 3,053,774
Patented Sept. 11, 1962

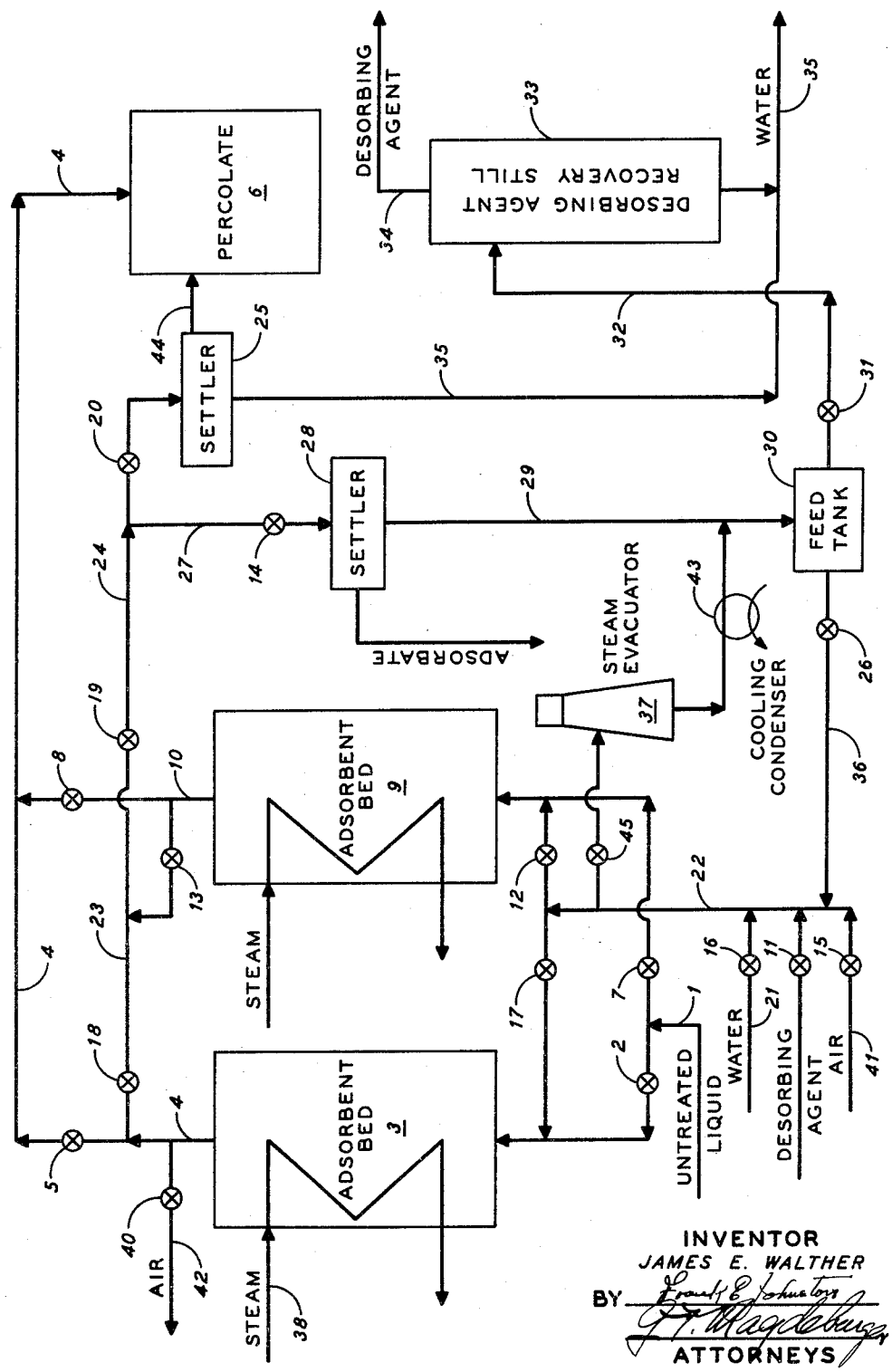

3,053,774
AQUEOUS REGENERATION OF SILICA GEL
James E. Walther, San Rafael, Calif., assignor to California Research Corporation, San Francisco, Calif., a corporation of Delaware
Filed May 16, 1960, Ser. No. 29,297
3 Claims. (Cl. 252—414)

This invention relates to a process for regenerating silica gel adsorbent saturated with a water-insoluble organic liquid having at least one component which is more polar in nature than the remainder of the liquid. Silica gel may be used to effect a separation of components of a multi component liquid by removing the more polar component by adsorption. At the same time, however, the gel tends to absorb certain amounts of the less polar component which is referred to as the percolate. The invention consists in water-washing the saturated silica gel using amounts of water to selectively displace the absorbed percolate without desorbing adsorbate, cleaning the gel by washing with a polar desorbing agent, and drying the gel to render it suitable for subsequent treating.

Operating efficiency can only be obtained in silica gel treating if the gel can be regenerated after use. During adsorption, the gel tends to absorb some of the less polar percolate fraction. It is most desirable to regenerate the gel in a manner which displaces this absorbed percolate from the gel but does not desorb the adsorbate, allowing this displaced percolate to be added directly to treated percolate. In the past, steam has been used to regenerate silica gel. Steam, however, removes both percolate and adsorbate. The percolate released by steam regeneration must therefore be retreated before admixing with treated percolate. In addition, the resulting attrition caused by direct steam contact with the gel in steam regeneration causes degradation in the structure of the gel adsorbent. This invention provides a way of regenerating saturated silica gel used in treating a multi-component water-insoluble organic liquid by introducing water into the saturated adsorbent in amounts sufficient to selectively displace the absorbed percolate from the gel without desorbing the adsorbate, desorbing the remaining adsorbate from the bed by contacting the percolate-free adsorbent with a polar desorbing agent, and heat-treating the evacuated silica gel adsorbent, thus rendering it in condition to treat further quantities of organic liquid. It was indeed surprising to find that a material as polar as water could be used to selectively displace the percolate, yet not displace the adsorbate as well by destroying the attraction between adsorbate and adsorbent. Once the water-insoluble percolate has been removed from the gel by water in a condition free of adsorbate, it can be separated from the water by allowing the two immiscible substances to separate. In this extremely simple manner the absorbed percolate is displaced in a pure state and can be added directly to the rest of the percolate. An extremely low proportion of percolate loss in the gel results. After the percolate is removed from the gel, the adsorbate is removed by passing a polar desorbing agent through the gel and subsequently evacuating, if desired, heating, and air-drying the bed to place it in condition for treating additional liquid. By regeneration according to this invention, the gel may be re-used many times, thereby rendering efficient what otherwise would be too inefficient a process for practicality.

A continuous process may be employed whereby one silica gel bed is being regenerated while at the same time another one is being used to treat the liquid. As soon as the one being used for adsorption has become contaminated with adsorbate so that a sufficiently pure percolate is no longer being obtained, this bed may be regenerated according to the invention while the one previously regenerated may be substituted in the treating process. The process of the invention may be briefly described as follows.

A water-insoluble organic liquid, comprising a less polar component which emerges as a percolate and a more polar component which remains adsorbed in the adsorbent, is passed through a treating zone containing silica gel. Separations can be effected between mixtures of compounds having varying degrees of attraction to silica gel. Suitable compounds, in order of decreasing relative polarity, are nitrogen compounds, polynuclear aromatic compounds, single ring aromatic compounds, olefins, and paraffins. Separation can be effected between mixtures of any group of these compounds as well as between each of the compounds themselves and their impurities, provided the materials to be separated differ in degree of attraction to silica gel. Silica-gel treating is especially effective to separate out impurities from olefins, cracked naphtha, and lubricating oils. The liquid hydrocarbon saturates the adsorbent and treated percolate emerges from the bed. As soon as the emerging percolate is no longer of a sufficient degree of purity, the bed is removed and regenerated according to this invention. Water is first passed through the bed to selectively displace the less attracted absorbed percolate while not desorbing the more attracted adsorbate. The temperature of the process should be in the range at which both the water and the organic liquid remain in liquid phase. Generally ambient temperatures and atmospheric pressures are used, but elevated temperatures and pressures which still keep the system in liquid phase may be employed. The percolate thus removed is separated from the water and is added to the rest of the percolate. The total recovery of percolate is almost 100 percent. Once a sufficient proportion of the percolate has been displaced, the remaining adsorbate is desorbed from the bed by contacting the percolate-free adsorbent with a conventional polar desorbing agent, such as a polar solvent, which passes to a recovery system where the adsorbate is removed and the desorbing agent recovered. Suitable agents are alcohols and ketones, e.g., ethyl alcohol and methylethyl ketone. The bed can then be heated and evacuated to remove substantially all the desorbing agent from the gel for recovery. After evacuation, the evacuated silica gel adsorbent is heat-treated above about 250° F., but no higher than about 800° F., to drive off all the moisture from the bed but avoiding sintering and resulting loss of gel life. Preferred temperatures range from about 250° to 400° F. After heating, the bed is air-dried, cooled, and rendered in condition for additional treating. In the process, the loss of percolate is close to negligible and the loss of polar desorbing agent is kept to a minimum. The invention furnishes an efficient means by which silica gel may be regenerated.

The drawing is a flow diagram of a silica-gel treating plant. Untreated water-insoluble organic liquid, having a more polar component and a less polar component, is passed through line 1 and valve 2, saturating bed 3 containing the adsorbent where the adsorbate is retained. The treated liquid emerges through line 4 and valve 5 into a receptacle 6. As soon as the percolate emerging from the saturated bed is no longer sufficiently pure for the purposes intended, valves 2 and 5 are closed and valves 7 and 8 opened. The untreated liquid then passes from line 1 through valve 7 to saturate a second bed 9 containing adsorbent, the percolate emerging through line 10, valve 8, into line 4 to the percolate receptacle 6. To regenerate bed 3 while bed 9 is being used for treating, valves 11, 12, 13, 14, 15 and 45 are closed and valves 16, 17, 18, 19 and 20 opened. Water is passed through line 21, valve 16, line 22, valve 17, bed 3 where the absorbed percolate is displaced, line 4, valve 18, line 23, valve 19, line 24 and valve 20 into settler tank 25 where the displaced percolate rises to the top and can be decanted off into the percolate receptacle 6 through line 44, and the water passes off through line 35. Sufficient water must be used to displace the percolate from the gel bed without desorbing the adsorbate. Generally about 1½ times the bed weight is sufficient. An amount less than the weight of the bed will not usually remove a sufficient proportion of the percolate. After the percolate has been removed, the bed must then be regenerated.

Cleaning the adsorbate from the bed is accomplished by first contacting the percolate-free adsorbent with a conventional polar desorbing agent to desorb the remaining polar adsorbate. This desorbing agent may be any conventional polar solvent, such as an alcohol or a ketone, such as acetone or methylethyl ketone. If a mixture of desorbing agent and water has been obtained from a prior regeneration cycle, this mixture may be used to preliminarily clean the bed before pure desorbing agent is applied. Generally an amount of agent equal to about 1½ times the bed weight is required to remove most of the adsorbate. A minimum amount of desorbing agent about equal to the bed weight is desirable. To introduce the desorbing agent in pure state or mixed with water, valves 16 and 20 are closed and valves 11 or 26, depending on whether desorbing agent or water mixture thereof is desired, and valve 14 are opened to allow agent or mixture to pass through line 21 or 36, valve 11 or 26, line 22, valve 17, bed 3, line 4, valve 18, line 23, valve 19, lines 24 and 27, and valve 14 into another settler tank 28. There the adsorbate is allowed to settle out of the desorbing agent-water mixture, and the mixture decanted through line 29 to feed tank 30 to be used as a desorbing agent or to be recovered in the recovery still 33.

Recovery of the desorbing agent from its mixture with water is accomplished by passing the mixture into a feed tank 30 where it is fed through valve 31 and line 32 into a desorbing agent recovery still 33. The desorbing agent is distilled off through line 34 and the water removed through line 35. This water may contain small quantities of adsorbate which can be recovered, if desired. If a desorbing agent-water mixture is desired, this may be obtained from tank 30 through line 36 and valve 26 and fed into line 22. Once a sufficient amount of the adsorbate has been removed from the gel by washing with desorbing agent, valves 5, 11 and 18 are closed, and valve 45 opened. By means of a steam evacuation system whereby steam passes through evacuator 37 in the direction of feed tank 30, dragging vapors from bed 3 through valves 17 and 45 and evacuator 37, the silica gel bed pressure is considerably reduced and the desorbing agent removed through cooling condenser 43 to tank 30. Generally, a steam jet of approximately 100 p.s.i.g. is required for evacuation. Simultaneously, the bed is heated by steam coming through line 38 to help drive off the vapors through valve 17. Approximately 450 p.s.i.g. steam is used to heat the bed to at least 250° F., but no higher than 800° F. because at that temperature sintering and a loss of gel life occurs. Temperatures in the range from 250° to 400° F. are most suitable to drive off the moisture without injuring the gel. The evacuated silica gel adsorbent is heat-treated for about 2½ hours to sufficiently reactivate the gel. After heating, valve 45 is closed, and valves 15 and 40 are opened to allow air to pass through line 41, valve 15, line 22, valve 17, through bed 3, and through valve 40 out exhaust line 42. By blowing air in this manner, cooling time is considerably shortened and the bed is quickly placed in condition for further treating. As soon as bed 9 yields percolate of insufficient purity, the untreated liquid stream may be switched back through bed 3 and bed 9 regenerated according to this invention as described.

As will be evident to those skilled in the art, various modifications can be made or followed, in the light of the foregoing disclosure and discussion, without departing from the spirit or scope of the disclosure or from the scope of the claims.

What is claimed is:

1. A method for regenerating a silica gel adsorbent saturated with a water-insoluble percolate and adsorbate which comprises introducing water into said saturated adsorbent in amounts sufficient to displace said percolate without desorbing said adsorbate, maintaining said water at about ambient temperatures, desorbing said adsorbate by contacting the percolate-free adsorbent with a polar desorbing agent selected from the group consisting of alcohols and ketones, and thereafter heat-treating the silica gel adsorbent at a temperature in the range of about 250°–800° F. until said adsorbent is sufficiently dry to be reused.

2. A method for regenerating silica gel adsorbent saturated with a water-insoluble percolate and adsorbate which comprises introducing water into said saturated adsorbent in amounts at least equal to the bed weight to displace said percolate without desorbing said adsorbate, maintaining said water at about ambient temperatures, desorbing said adsorbate by contacting the percolate-free adsorbent with a polar desorbing agent selected from the group consisting of alcohols and ketones, said agent being selected and used in sufficient quantities to desorb said adsorbate without having a deleterious effect on said adsorbent, and thereafter heat-treating the silica gel adsorbent at a temperature in the range of about 250°–800° F. until said adsorbent is sufficiently dry to be reused.

3. A method for regenerating silica gel adsorbent saturated with a water-insoluble percolate and adsorbate which comprises introducing water into said saturated adsorbent in amounts equal to at least 1½ times the bed weight to displace said percolate without desorbing said adsorbate, maintaining said water at about ambient temperatures, desorbing said adsorbate by contacting the percolate-free adsorbent with a polar desorbing agent selected from the group consisting of alcohols and ketones, said agent being selected and used in sufficient quantities to remove said adsorbate without having a deleterious effect on said adsorbent, and thereafter heat-treating the silica gel adsorbent at a temperature in the range of about 250°–800° F. until said adsorbent is sufficiently dry, leaving the adsorbent in condition to treat additional quantities of liquid.

References Cited in the file of this patent

UNITED STATES PATENTS

| | | |
|---|---|---|
| 2,236,679 | Ferguson et al. | Apr. 1, 1941 |
| 2,769,751 | Paull | Nov. 6, 1956 |